United States Patent
Yang

(10) Patent No.: US 7,474,324 B2
(45) Date of Patent: *Jan. 6, 2009

(54) PRINTING APPARATUS USING ORDER-SEPARATION TYPE OPTICAL MODULATOR

(75) Inventor: Haeng Seok Yang, Gyeonggi-do (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 401 days.

This patent is subject to a terminal disclaimer.

(21) Appl. No.: 11/189,562

(22) Filed: Jul. 25, 2005

(65) Prior Publication Data

US 2006/0119693 A1 Jun. 8, 2006

(30) Foreign Application Priority Data

Dec. 2, 2004 (KR) .................. 10-2004-0100575

(51) Int. Cl.
- B41J 2/47 (2006.01)
- B41J 27/00 (2006.01)
- B41J 2/385 (2006.01)
- G02F 1/33 (2006.01)
- G02F 1/00 (2006.01)
- G02B 5/18 (2006.01)

(52) U.S. Cl. .............. 347/255; 347/241; 347/134; 359/308; 359/237; 359/558

(58) Field of Classification Search ............ 359/290, 359/308, 237, 558; 347/134, 104, 241, 255
See application file for complete search history.

(56) References Cited

U.S. PATENT DOCUMENTS

| | | | | |
|---|---|---|---|---|
| 4,861,983 A * | 8/1989 | Sasada et al. | ............ | 250/235 |
| 6,130,701 A * | 10/2000 | Ito | ............ | 347/241 |
| 6,169,565 B1 * | 1/2001 | Ramanujan et al. | ............ | 347/238 |
| 6,542,278 B2 * | 4/2003 | Kato | ............ | 359/205 |
| 6,650,354 B2 * | 11/2003 | Morizono et al. | ............ | 347/255 |
| 6,979,074 B2 * | 12/2005 | Watanabe et al. | ............ | 347/50 |

* cited by examiner

Primary Examiner—Stephen D Meier
Assistant Examiner—Sarah Al-Hashimi
(74) Attorney, Agent, or Firm—Christensen O'Connor Johnson Kindness PLLC

(57) ABSTRACT

Disclosed herein is a printing apparatus using an order-separation type optical modulator. The printing apparatus includes an illumination lens system, a diffraction type optical modulator, a filter system, and a projection system. The illumination lens system converts light, which is output from a light source, into linear light and outputs linear, parallel light, the diffraction type optical modulator performs desired modulation on the linear, parallel light emitted from the illumination lens system and forms diffracted light having a plurality of diffraction orders.

5 Claims, 7 Drawing Sheets

PRINTING APPARATUS USING ORDER-SEPARATION TYPE OPTICAL MODULATOR

BACKGROUND OF THE INVENTION

1. Field of the Invention

The present invention relates generally to a printing apparatus and, more particularly, to a printing apparatus using an order-separation type optical modulator, which allows a plurality of diffracted beams, which are formed to have a plurality of diffraction orders and are derived from a single beam by reflection and diffraction, to scan divided scanning areas according to diffraction order, thus improving resolution.

2. Description of the Related Art

Printer technology is being developed towards high speed, compactness, high quality and low price. A general printer employs a laser-scanning scheme that performs scanning using a Laser Diode (LD) and an f-θ lens.

To implement a high-speed printer, an image head scheme that uses a multi-beam type beam-forming device is employed. In such a scheme, high speed and high quality can be achieved, but a problem occurs in that cost is high because a plurality of light sources must be used.

FIG. 1 illustrates an example of a conventional laser-scanning scheme that uses a single light source and an f-θ lens. With reference to FIG. 1, the operation of the conventional laser-scanning scheme is described below.

A light beam is generated by an LD 10 in response to a video signal, passed through a collimator lens 12 and then converted into parallel light. Thereafter, the converted parallel light is converted into linear light, which is parallel to a scanning direction, by a cylinder lens 13 and is then incident on a polygon mirror 14.

As described above, in the case in which the linear light, which is parallel to a scanning direction, enters through the cylinder lens 13, the polygon mirror 14 rotated by a motor scans the entering linear light in a direction towards the f-θ lens 15.

Thereafter, the linear light scanned at a uniform angular velocity by the polygon mirror 14 is deflected in a scanning direction, experiences aberration correction and, therefore, is scanned on a scanning area at uniform velocity.

It is difficult for the above-described scanning scheme to achieve high-speed printing due to a slow switching speed and the scanning speed of the polygon mirror 14.

That is, in order to increase the scanning speed of the light beam, the polygon mirror 14 must be rotated using a high-speed motor. However, in this case, there are problems in that the high-speed motor is high in price, and operational reliability is lowered because the motor, which rotates at high speed, causes heat, vibration and noise, so that an improvement of scanning speed cannot be expected.

For another method of improving the speed of an optical scanning device, there is an image head printing scheme using a multi-beam type beam-forming device.

That is, as shown in FIG. 2, a multi-beam is formed by constructing a Light Emitting Diode (LED) array 21 on an image head 17 such that a printing paper may be fully covered by LEDs 22, so that printing can be performed one line at a time without the use of the polygon mirror and the f-θ lens, unlike the laser scanning scheme and, therefore, printing speed can be remarkably improved.

However, in the case in which a plurality of LEDs is used to form the LED array 21, there are problems in that cost increases, and uniform images cannot be acquired because optical uniformity among the LEDs of the array is degraded.

SUMMARY OF THE INVENTION

Accordingly, the present invention has been made keeping in mind the above problems occurring in the prior art, and an object of the present invention is to provide a printing apparatus using an order-separation type optical modulator, which allocates a plurality of orders of diffraction beams, which are output from an optical modulator, to photosensitive areas of drum surfaces and allows the allocated photosensitive areas to be exposed to light, thus increasing resolution.

In order to accomplish the above object, the present invention provides a printing apparatus using an order-separation type optical module, including an illumination lens system for converting light, which is output from a light source, into linear light and outputting linear, parallel light; a diffraction type optical modulator for performing desired modulation on the linear, parallel light emitted from the illumination lens system and forming diffracted light having a plurality of diffraction order; a filter system for separating the diffracted light, which has a plurality of diffraction orders and is formed by the diffraction type optical modulator, according to order, and passing the separated diffracted light therethrough; and a projection system having a drum surface divided into one or more photosensitive areas, so as to allocate the separated diffracted light to respective divided photosensitive areas, when the separated diffracted light separated by the filter system according to order is incident on the projection system and, thereby reproducing images.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

A printing apparatus using an order-separation type optical modulator according to the present invention is described in detail with reference to the accompanying drawings below. Although a piezoelectric diffraction type optical modulator is described as an example below, projection, reflection, or some other diffraction type optical modulators can be employed.

Figure 1:
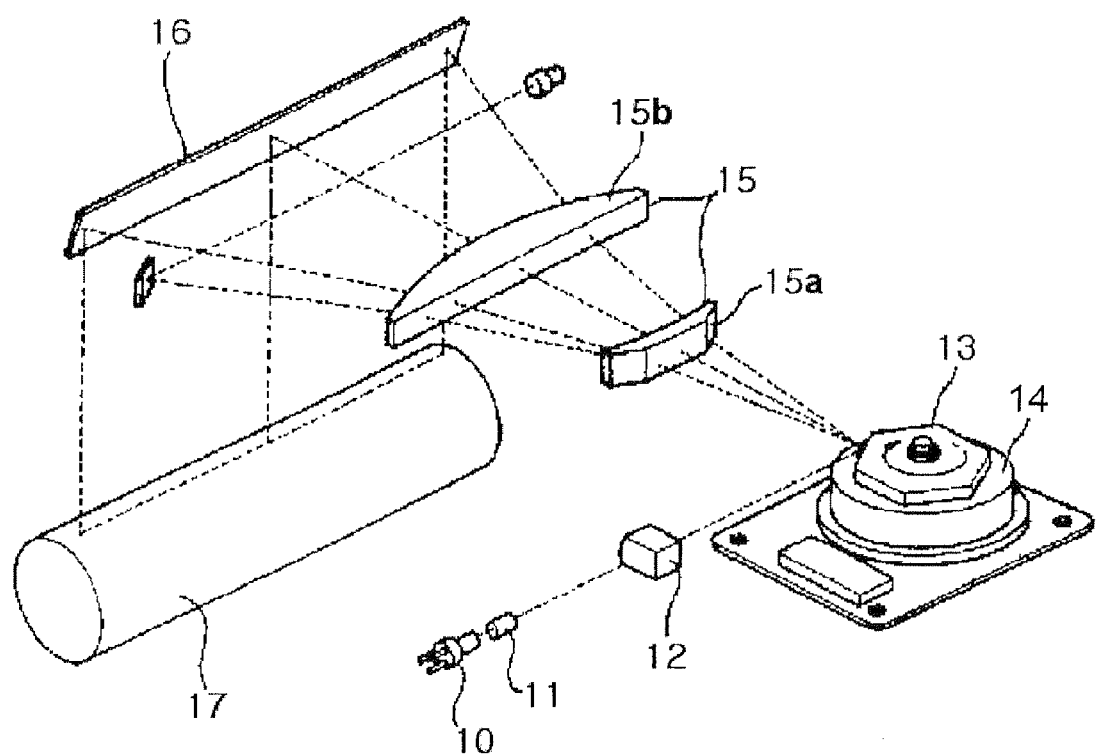
FIG. 1 is a view showing a conventional laser-scanning scheme that uses a single light source and an f-θ lens.
Figure 2:
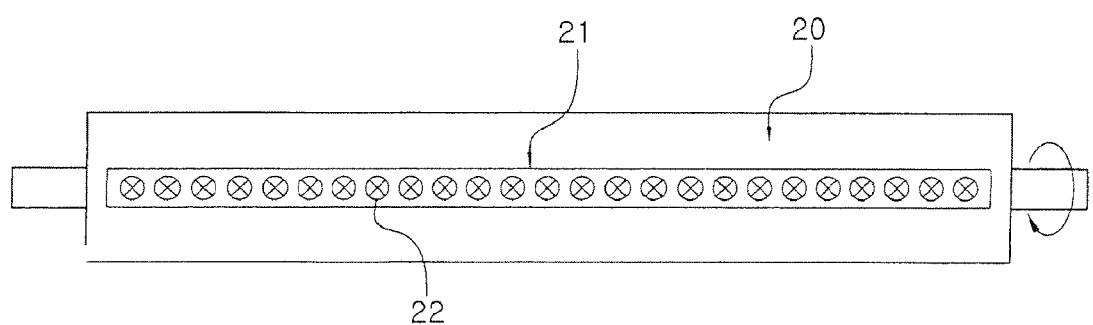
FIG. 2 is a view showing an image head printing scheme that performs laser scanning using a multi-beam that is formed by an LED array provided in an image head.
Figure 3:
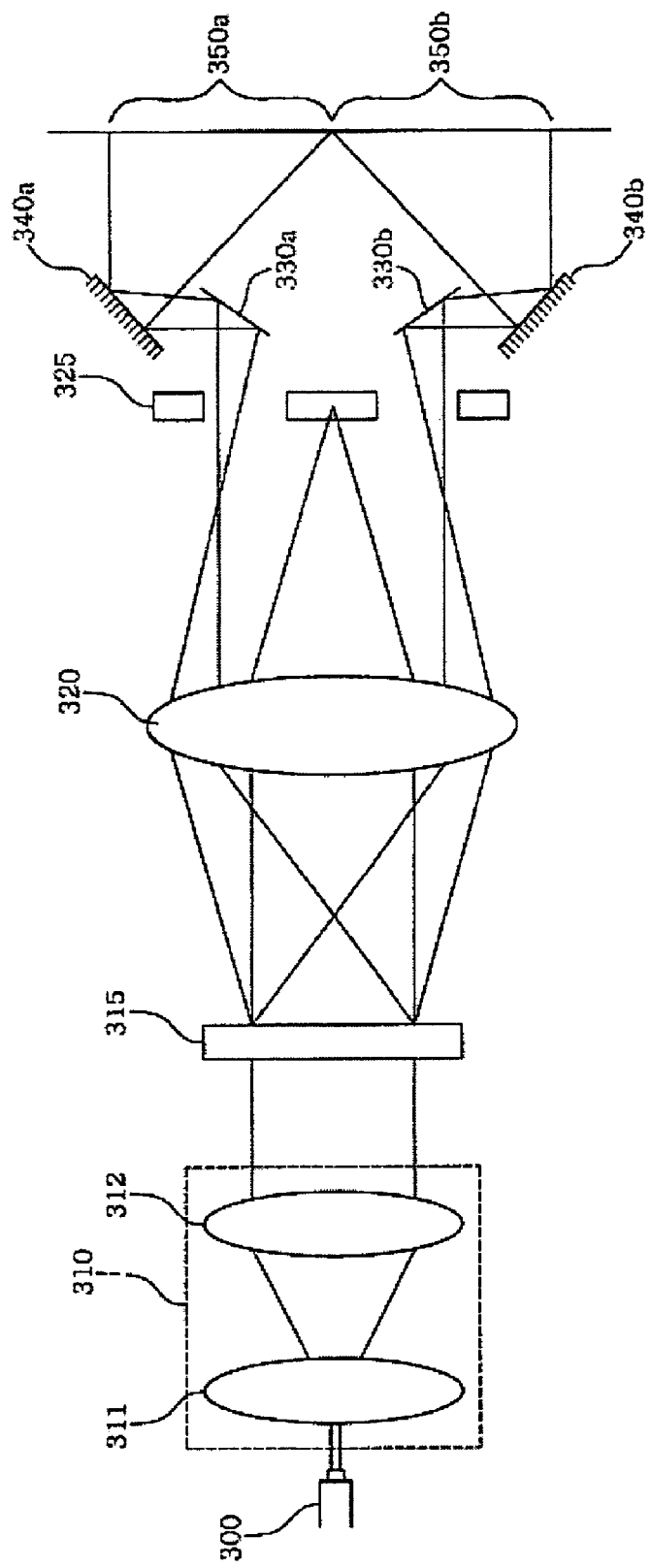
FIG. 3 is a view showing the construction of a printing apparatus using an order-separation type optical modulator according to the present invention.

FIG. 3 is a view showing the construction of the printing apparatus using an order-separation type optical modulator according to the present invention.

Referring to FIG. 3, the printing apparatus using an order-separation type optical modulator according to the present invention includes a light source 300, an illumination lens system 310, a diffraction type optical modulator 315, a Fourier lens 320, a filter 325, reflection mirrors 330 and 340, and drum surfaces 350a and 350b.

For the light source 300, a light source manufactured using semiconductor devices, such as LEDs or LDs, may be used.

Figure 4A:
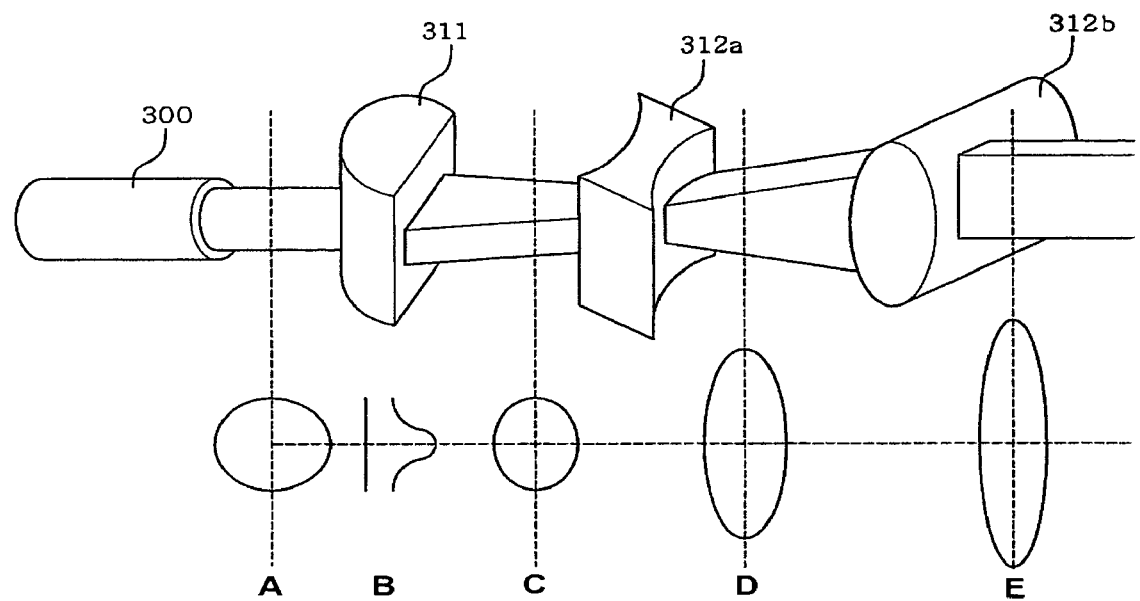
FIGS. 4A~4C is a view showing the light paths of the illumination lens system of FIG. 3.
Figure 4B:
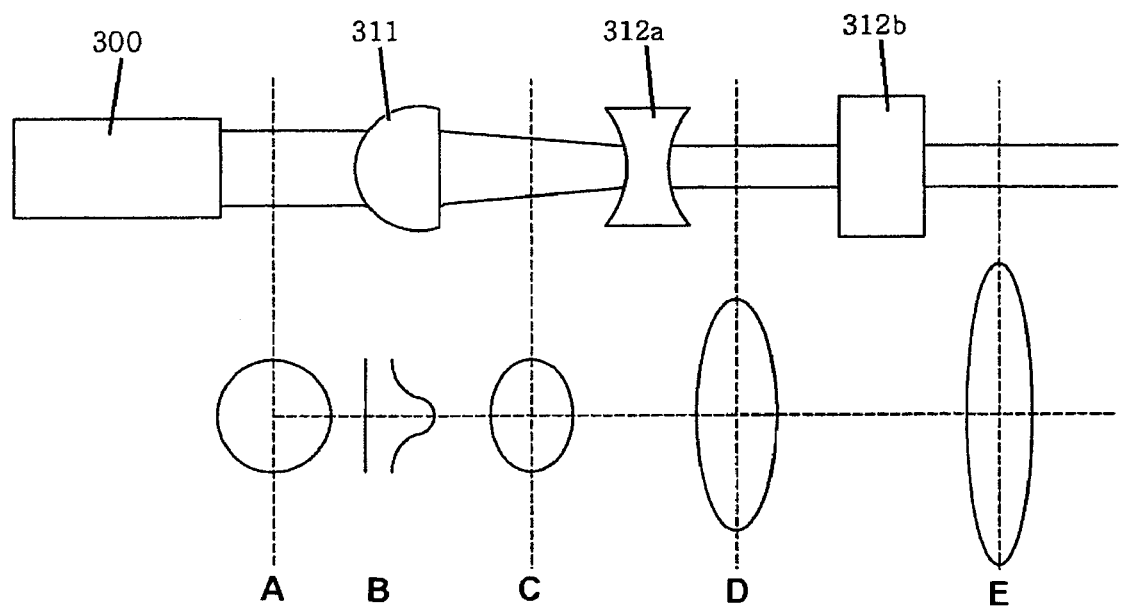
Figure 4C:
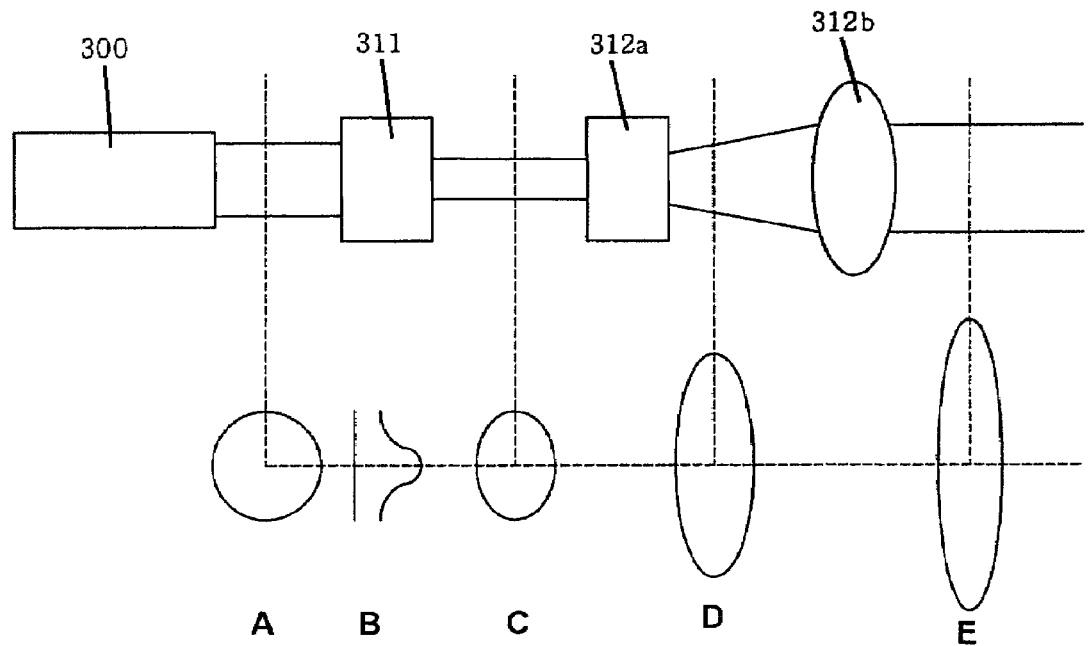

An example of the cross section of source light is shown in (A) of FIGS. 4A~4C. With reference to (A) of FIGS. 4A~4C, the source light has a circular cross section. As shown in (B) of FIGS. 4A~4C, the light intensity profile of the source light assumes a Gaussian distribution.

The illumination lens system 310 converts incident light into linear, parallel light having an elliptical cross section, and includes a cylinder lens 311 and a collimator lens 312.

That is, the illumination lens 310 converts light, which is output from the light source 300, into linear light that is parallel to the direction of a light path, and allows the linear light to be incident on a diffraction type optical modulator 315 described later, and includes the cylinder lens 311 and the collimator lens 312.

In order to allow the parallel light output from the light source 300 to be incident on the corresponding diffraction type optical modulator 315, which is located on the same plane as the direction of the light path, so as to be parallel to the direction of a light path, the cylinder lens 311, as shown in (C) of FIGS. 4A~4C, converts the light, which is output from the light source 300, to linear light that is parallel to the direction of a light path, and allows the converted linear light to be incident on the corresponding diffraction type optical modulator 315 through the corresponding collimator lens 312.

In this case, the collimator lens 312 converts spherical light, which is output from the light source 300 through the cylinder lens 311, to parallel light, and allows the parallel light to be incident on the diffraction type optical modulator 315.

As shown in FIGS. 4A~4C, the collimating lens 312, for example, includes a concave lens 312a and a convex lens 312b.

The concave lens 312a, as shown in (D) of FIGS. 4A~4C, allows the linear light, which is output from the cylinder lens 311, to be diverged vertically and allows the diverging light to be incident on the convex lens 312b. The convex lens 312b, as shown in (E) of FIGS. 4A~4C, converts incident light, which is output from the concave lens 312a, to parallel light and outputs the converted parallel light. FIG. 4A is a perspective view showing an optical system composed of a light source, a cylinder lens and a collimating lens, FIG. 4B is a plan view, and FIG. 4C is a side sectional view.

Thereafter, the diffraction type optical modulator 315 diffracts the incident light output from the illumination lens system and generates diffraction light having a plurality of orders.

Figure 5:
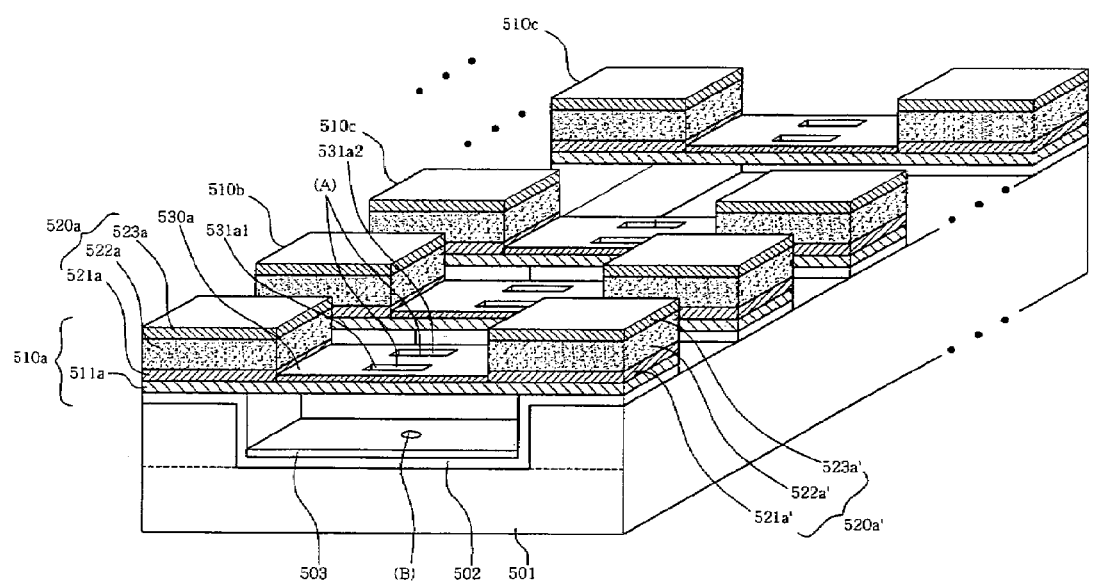
FIG. 5 is a perspective view of the diffraction type optical modulator of FIG. 3.

An open hole-based diffraction type optical modulator that is an example of the diffraction type optical modulator 315 is shown in FIG. 5. With reference to FIG. 5, the open hole-based diffraction type optical modulator includes a silicon substrate 501a, an insulation layer 502a, a lower micro mirror 503a, and a plurality of elements 510a to 510n. Although the insulation layer and the lower micro mirror are formed of separate layers, the insulation layer itself may also function as the lower micro mirror when the insulation layer has a property of reflecting light.

The silicon substrate 501a includes a depressed portion to provide air spaces to the elements 510a to 510n, the insulation layer 502a is formed on the silicon substrate 501a, the lower micro mirror 503a is deposited on the insulation layer 502a, and the lower surfaces of the elements 510a to 510n are attached to both sides of the silicon substrate 501a beside the depressed portion. The silicon substrate is made of a single material, such as Si, $Al_2O_3$, $ZrO_2$, Quartz, or $SiO_2$, and a base substrate and an upper layer (indicated by a dotted line in FIG. 5) may be made of heterogeneous materials.

The lower micro mirror 503a is deposited on the silicon substrate 501a, and reflects and diffracts incident light. The lower micro mirror 503a may be made of a metal material, such as Al, Pt, Cr, or Ag.

The element 510a is formed in a ribbon shape, and is provided with a lower support 511a, the lower surfaces of both ends of which are attached to both side portions of the silicon substrate 501a beside the depressed portion of the silicon substrate 501 so that the center portion of the lower support 511a is spaced apart from the depressed portion of the silicon substrate 501. Although, the element 510a is described as a representative, it is to be understood that other elements are formed in the same way as is the example.

Piezoelectric layers 520a and 520a' are provided on both sides of the lower support 511a, and a driving force is provided to the element 510a due to the contraction and expansion of the piezoelectric layers 520a and 520a'.

The lower support 511a may be made of an Si oxide-based material (for example, $SiO_2$), an Si nitride-based material, a ceramic substrate (Si, $ZrO_2$, or $Al_2O_3$), or an Si carbide-based material. The lower support 511a can be omitted if not needed.

Furthermore, the left and right sides of the piezoelectric layers 520a and 520a' include lower electrode layers 521a and 521a' formed to provide piezoelectric voltage, piezoelectric material layers 522a and 522a' stacked on the lower electrode layers 521a and 521a' and formed to generate upper and lower driving forces by contraction and expansion at the time when voltage is applied to both sides of the piezoelectric material layers 522a and 522a', and upper electrodes 523a and 523a' stacked on the piezoelectric material layers 522a and 522a' and formed to provide the piezoelectric voltage to the piezoelectric material layers 522a and 522a'. When voltage is applied between the upper electrodes 523a and 523a' and the lower electrode layers 521a and 521a', the contraction and expansion of the piezoelectric material layers 522a and 522a' result in upward and downward movement of the lower support 511a.

The electrodes 521a, 521a', 523a and 523a' may be made of an electrode material, such as Pt, Ta/Pt, Ni, Au, Al, and $RuO_2$, and the electrode material is deposited within a range of 0.01~3 μm using a sputter or evaporation method.

Meanwhile, the upper micro mirror 530a is deposited on the center portion of the lower support 511a and has a plurality of open holes 531a1 and 531a2. In this case, it is preferred that the open holes 531a1 and 531a2 be formed in a rectangular shape, and the open holes 531a1 and 531a3 may be formed in the shape of a certain closed curve, such as a circular or an elliptical shape. Furthermore, there is no need to provide a separate upper micro mirror when the lower support is made of a light-reflective material and the lower support can function as the upper micro mirror.

The open holes 531a1 and 531a2 allow incident light incident on the element 510a to be passed therethrough and then be incident on the lower micro mirror 503a corresponding to the portion at which the open holes 531a1 and 531a2 are formed, so that the lower and upper micro mirrors 503a and 530a can form a pixel.

That is, the portion A of the upper micro mirror 530a, in which the open holes 531a1 and 531a2 are formed, and the portion B of the lower micro mirror 503a can form a pixel.

In this case, incident light, which passes through the portion at which the open holes 531a1 and 531a2 of the upper micro mirror 530a are formed, can be incident on a corresponding portion of the lower micro mirror 503a, and maximally diffracted light is generated when the gap between the upper and lower mirrors 530a and 503a is one of odd multiples of $\lambda/4$.

Meanwhile, the diffraction type optical modulator 315, as described above, generates diffracted light by diffracting the linear light output from the illumination lens system 310 and then allows the diffracted light to be incident on the Fourier lens 320.

Figure 6:
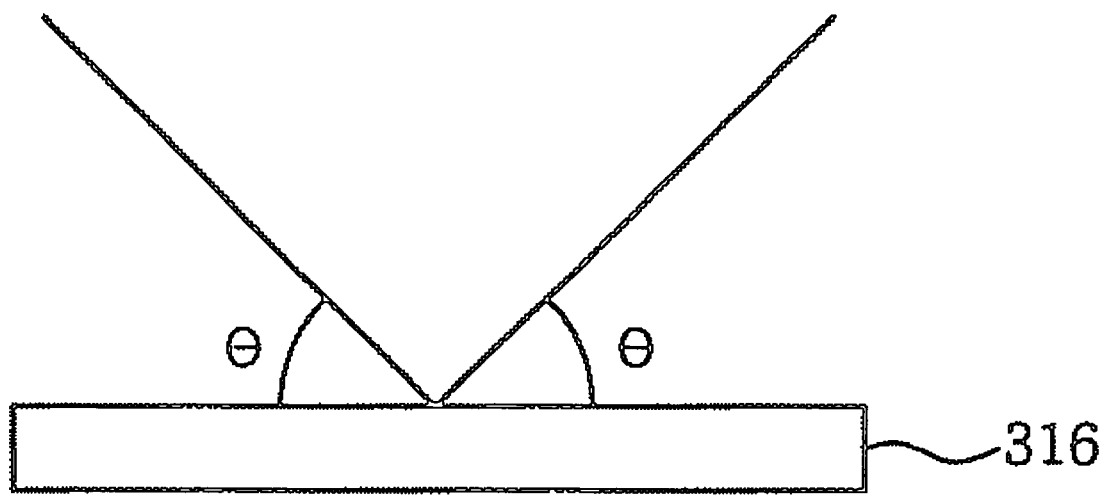
FIG. 6 is a view showing the angle of reflection of the diffraction type optical modulator of FIG. 3.

In this case, the angle of reflection of the generated diffraction light is shown in FIG. 6, in which it can be seen that an incident angle and a reflection angle equal each other. That is, when the incident angle of the diffracted light, which is incident on the diffraction type optical modulator 315, is $\theta°$, the angle of the light reflected therefrom becomes $\theta°$.

Figure 7:
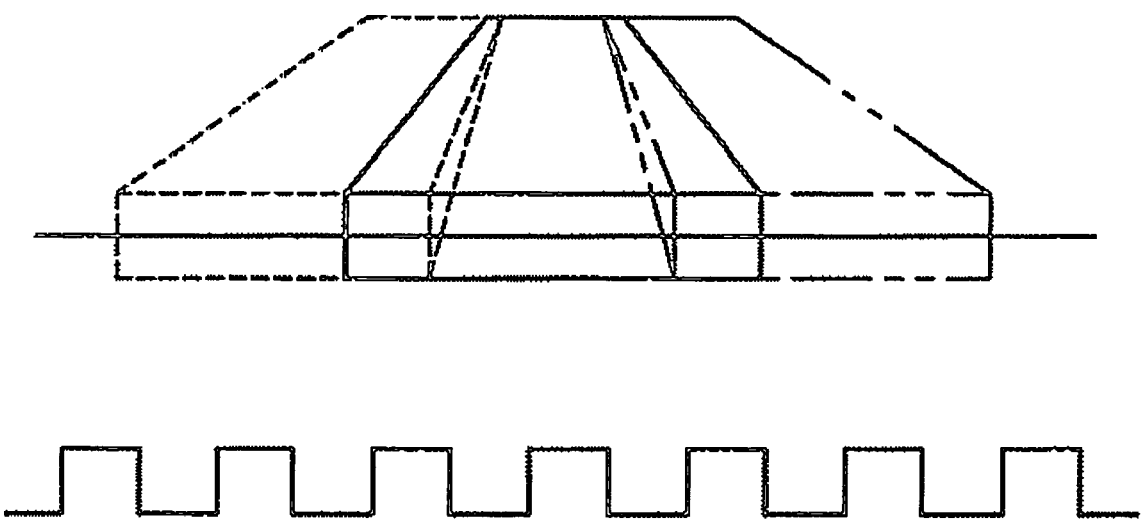
FIG. 7 is a view showing diffracted light generated by the diffraction type optical modulator of FIG. 3.

The diffracted light generated by the diffraction type optical modulator 315 is shown in FIG. 7, in which 0-order and ±1-order diffracted light is generated in the direction of the period of gratings. That is, as shown in FIG. 7, the diffraction light having a plurality of orders is generated.

Meanwhile, the diffracted light incident on the Fourier lens 320 is separated according to order, and the separated diffracted light is incident on the filter 325. This point is represented in FIGS. 8A and 8B.

Figure 8A:
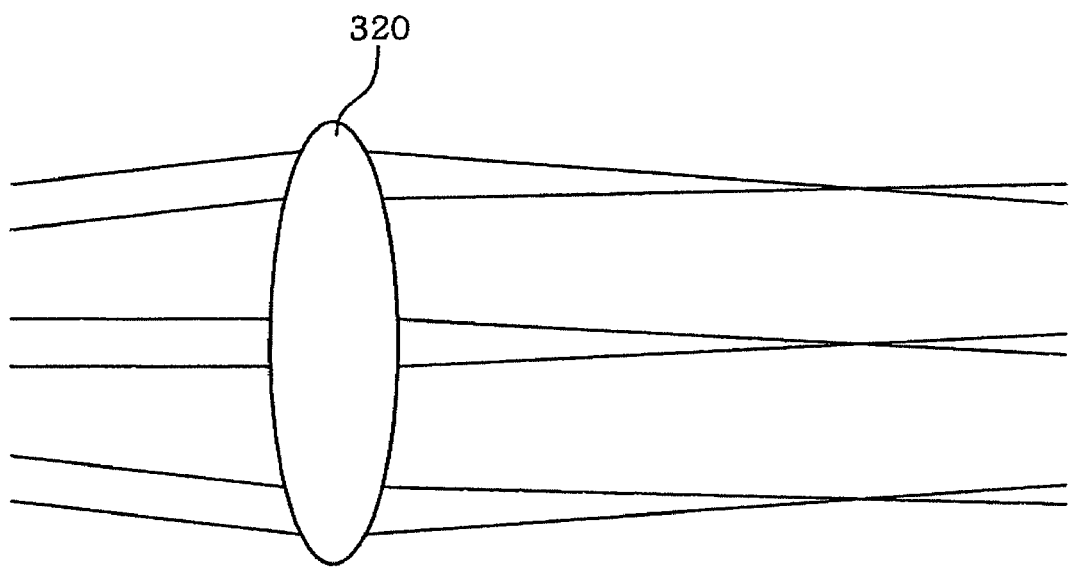
FIGS. 8A and 8B are views showing the paths of light passed through a Fourier filter system.
Figure 8B:
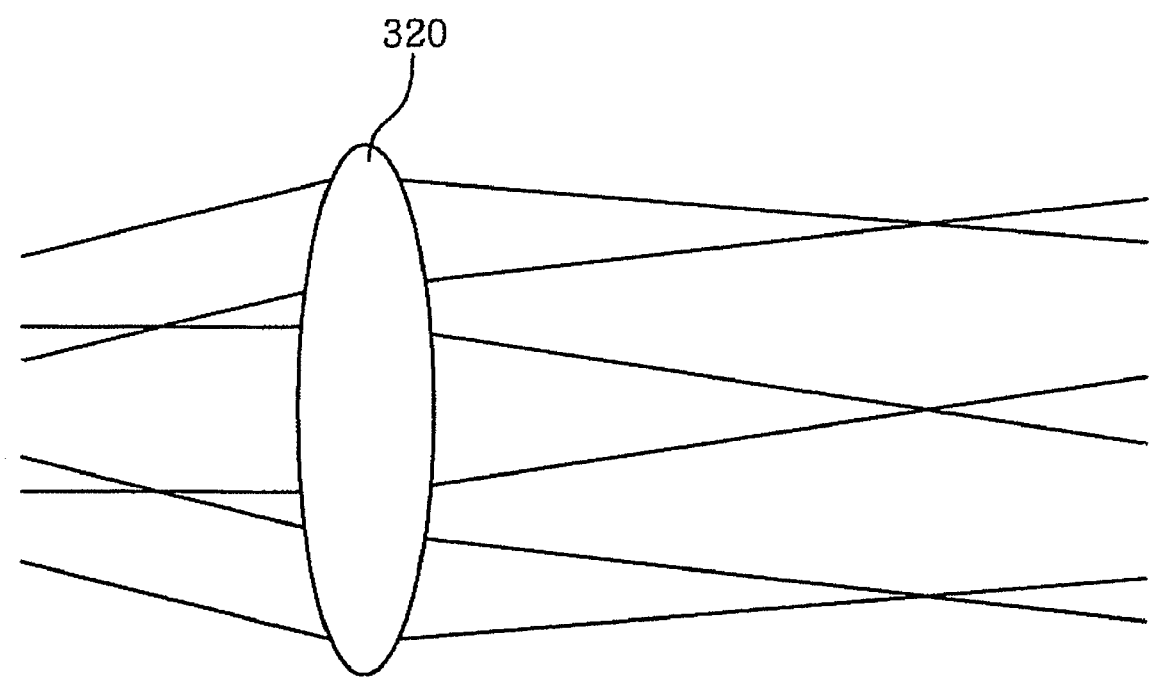

FIG. 8A is a plan view, and FIG. 8B is a side sectional view. With reference to FIG. 8A, the diffracted light is focused when the diffracted light having each order is incident on the Fourier lens 320.

Furthermore, in FIG. 8B, 0-order diffracted light is focused on a certain point when passed through the Fourier lens 320. In this case, +1-order diffracted light is focused on a point spaced above the point on which the 0-order diffracted light is focused, and −1-order diffracted light is focused on a point below the point on which the 0-order diffracted light focused. When the slot of the filter 325 is positioned at a point near one of such focused points, only diffraction having a desired order can be passed through the filter 325.

That is, the 0-order diffracted light can be used when a slot for passing the 0-order diffracted light is positioned at a point on which the 0-order diffracted light is focused in the case in which the 0-order diffracted light is desired to be used, and the +1-order diffracted light can be used when a slot for passing the +1-order diffracted light is positioned at a point on which the −1-order diffracted light is focused in the case in which the −1-order diffracted light is desired to be used.

Particularly, in the present invention, the diffraction type optical modulator 315 performs time division modulation on optical information that must be incident on a first drum surface 350a for a first period of time, and then performs time division modulation on optical information that must be incident on a second drum surface 350b for a second period of time. Thereafter, the filter 325 passes the +1-order diffracted light therethrough for the first period of time, thus allowing first modulated diffracted light to be incident on the first drum surface 350a, and passes the −1-order diffracted light therethrough for the second period of time, thus allowing second modulated diffracted light to be incident on the first drum surface 350a. By doing so, doubled resolution can be acquired even though the diffraction type optical modulator 315 having the same pixels is used.

Figure 9A:
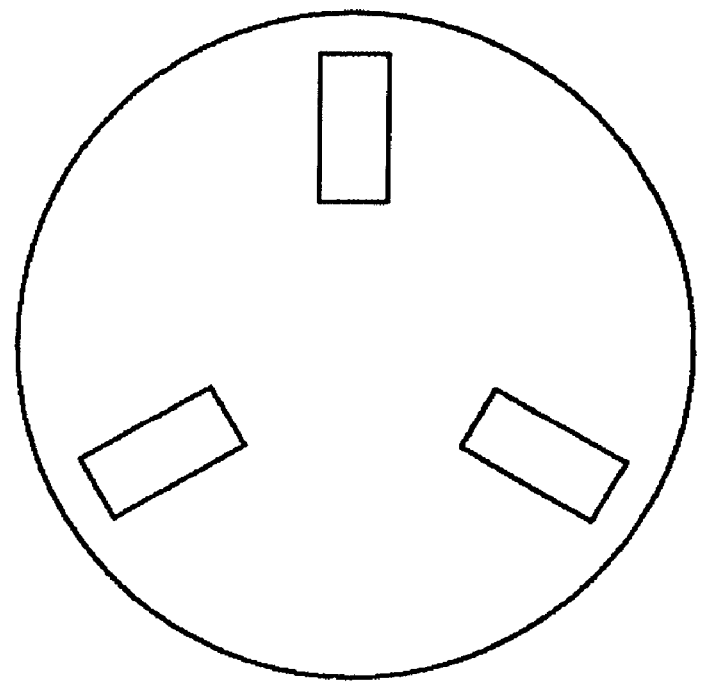
FIGS. 9A and 9B are views showing the spatial filter of FIG. 3.
Figure 9B:
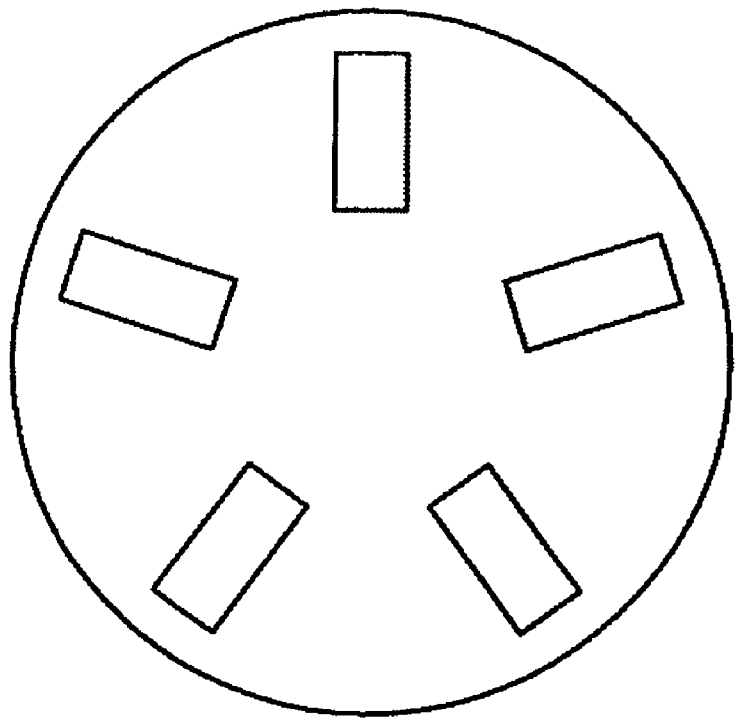

Meanwhile, in the case in which the diffraction type optical modulator 315 performs not only time division but also modulation according to order, the −1-order diffracted light must not be passed through the filter 325 when the +1-order diffracted light is passed therethrough, and the +1-order diffracted light must not be passed through the filter 325 when the −1-order diffracted light is passed therethrough. For this purpose, the filter 325 may be implemented using a rotation type filter shown in FIGS. 9A and 9B, and may be designed so that slots are not aligned to each other. By doing so, filtering can be performed in a time division manner.

In this case, the number of slots of the rotation type filter must be 2N+1, where N is an integer.

As described above, the printing apparatus using a diffraction type optical modulator according to the present invention allows spots to be formed in a wide screen space using a small number of actuating cells, thus being capable of increasing resolution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A printing apparatus using an order-separation type optical module, comprising:
    an illumination lens system for converting light, which is output from a light source, into linear light and outputting linear, parallel light;
    a diffraction type optical modulator for performing desired modulation on the linear, parallel light emitted from the illumination lens system and forming diffracted light having a plurality of diffraction order;
    a filter system for separating the diffracted light, which has a plurality of diffraction orders and is formed by the diffraction type optical modulator, according to order, and selectively allowing passage of the separated diffracted light therethrough; and
    a projection system having a drum surface divided into one or more photosensitive areas, so as to allocate the separated diffracted light to respective divided photosensitive areas, whereby the separated diffracted light separated by the filter system according to order is incident on the projection system and, thereby reproducing images from the plurality of diffraction orders incident on the projection system.

2. The printing apparatus as set forth in claim 1, wherein the illumination lens system comprises;
    a cylinder lens for causing the light, which is emitted from the light source, to be linear; and
    a collimating lens for collimating the linear light passed through the cylinder lens.

3. The printing apparatus as set forth in claim 1, wherein the filter system comprises;
    a Fourier lens for focusing the diffracted light, which is generated by the diffraction type optical modulator and has the plurality of diffraction order, according to diffraction order; and
    a filter for allowing diffracted light having a desired diffraction order, which belongs to diffracted light focused according to diffraction order by the Fourier lens and has the plurality of diffraction orders, to be passed therethrough.

4. A printing apparatus using an order-separation type optical module, comprising:

an illumination lens system for converting light, which is output from a light source, into linear light and outputting linear, parallel light;

a diffraction type optical modulator for performing desired modulation on the linear, parallel light emitted from the illumination lens system and forming diffracted light having a plurality of diffraction order;

a filter system for separating the diffracted light, which has a plurality of diffraction orders and is formed by the diffraction type optical modulator, according to order, and passing the separated diffracted light therethrough;

a projection system having a drum surface divided into one or more photosensitive areas, so as to allocate the separated diffracted light to respective divided photosensitive areas, when the separated diffracted light separated by the filter system according to order is incident on the projection system and, thereby reproducing images; and wherein the filter is a spatial filter that is a circular plate and has 2N+1 slits, where N is an integer.

5. A printing apparatus using an order-separation type optical module, comprising:

an illumination lens system for converting light, which is output from a light source, into linear light and outputting linear, parallel light;

a diffraction type optical modulator for performing desired modulation on the linear, parallel light emitted from the illumination lens system and forming diffracted light having a plurality of diffraction orders;

a filter system for separating the diffracted light, which has a plurality of diffraction orders and is formed by the diffraction type optical modulator, according to order, and selectively allowing passage of the separated diffracted light therethrough;

a projection system having a drum surface divided into one or more photosensitive areas, so as to allocate the separated diffracted light to respective divided photosensitive areas, when the separated diffracted light separated by the filter system according to order is incident on the projection system and, thereby reproducing images; and wherein the filter unit allows passage of 0th and ±1st order diffractive beams to pass through the filter unit.

* * * * *

UNITED STATES PATENT AND TRADEMARK OFFICE
CERTIFICATE OF CORRECTION

PATENT NO.       : 7,474,324 B2                               Page 1 of 1
APPLICATION NO.  : 11/189562
DATED            : January 6, 2009
INVENTOR(S)      : H. S. Yang It is certified that error appears in the above-identified patent and that said Letters Patent is hereby corrected as shown below:

| COLUMN | LINE | ERROR |
|---|---|---|
| 6 (Claim 1, line 9) | 40 | "order;" should read --orders;-- |

Signed and Sealed this

Twentieth Day of October, 2009

David J. Kappos
*Director of the United States Patent and Trademark Office*